INVENTORS
JOHN M. FOWLE
RICHARD W. MUCHMORE

BY

Mellin + Hanscom
ATTORNEYS

Patented May 5, 1953

2,637,078

UNITED STATES PATENT OFFICE 2,637,078

MACHINE FOR CENTRIFUGAL CASTING

John M. Fowle, Los Altos, and Richard W. Muchmore, Redwood City, Calif., assignors to Dura Bond Bearing Co., Palo Alto, Calif., a corporation of California Application August 1, 1949, Serial No. 107,924

2 Claims. (Cl. 22—58.5)

This invention relates to a machine for centrifugal casting. More particularly, it relates to a machine for centrifugally casting a lining onto a tubular member.

In producing tubular bearings, such as cam shaft bearings, it is necessary to provide a steel or bronze tube or the like with a lining of Babbitt or other suitable bearing metal. It has been a common practice to apply the lining of bearing metal to a flat sheet and to roll the sheet into the desired tubular form, thereby providing a split bearing. Such bearings are disadvantageous in certain respects. Thus, split bearing of the character described are difficult to rebore and recondition.

Methods of and machines for casting a lining on a tubular member so as to provide a continuoue bearing have been devised or proposed heretofore but are subject to certain disadvantages. Thus, they are applicable only to very short lengths of tube and, accordingly, are not adapted to a continuous operation. Besides the operating inconvenience of lining short lengths of tube, it is advantageous to machine tubes of greater length.

It is an object of this invention to provide an improved form of casting machine for producing tubular bearings of the character described.

It is a particular object of the invention to provide a machine for producing tubular bearings of the character described, such machine being continuous in its operation and applicable to provide a uniform lining on a tubular member of indefinite length.

These and other objects of the invention will be apparent from the ensuing description and the appended claims.

One form which the invention may assume is exemplified in the following description and illustrated by way of example in the accompanying drawing in which.

Figure 1:
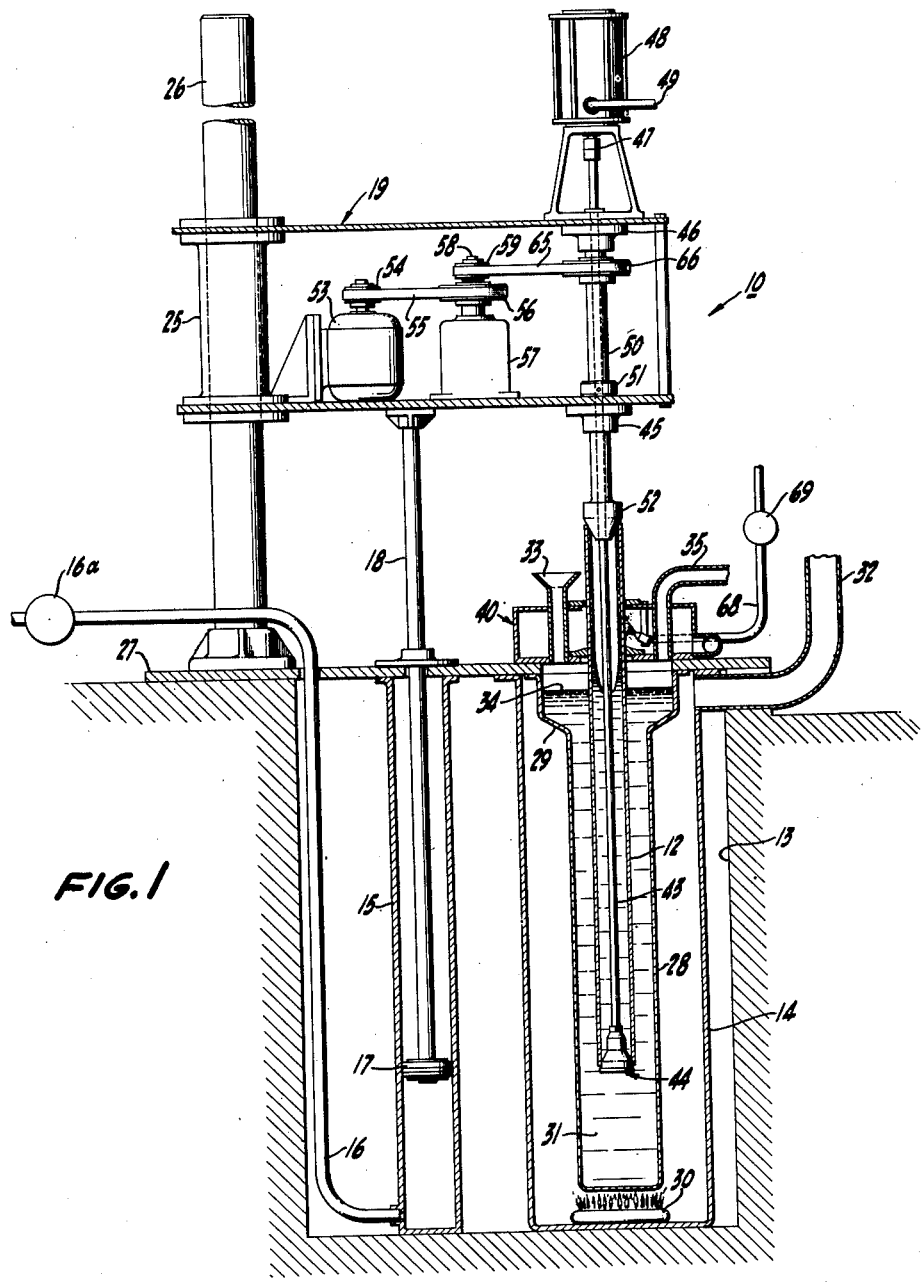
Fig. 1 is a view, partly in vertical section and partly in elevation, of a complete casting assembly and machine constructed and assembled in accordance with the invention.
Figure 2:
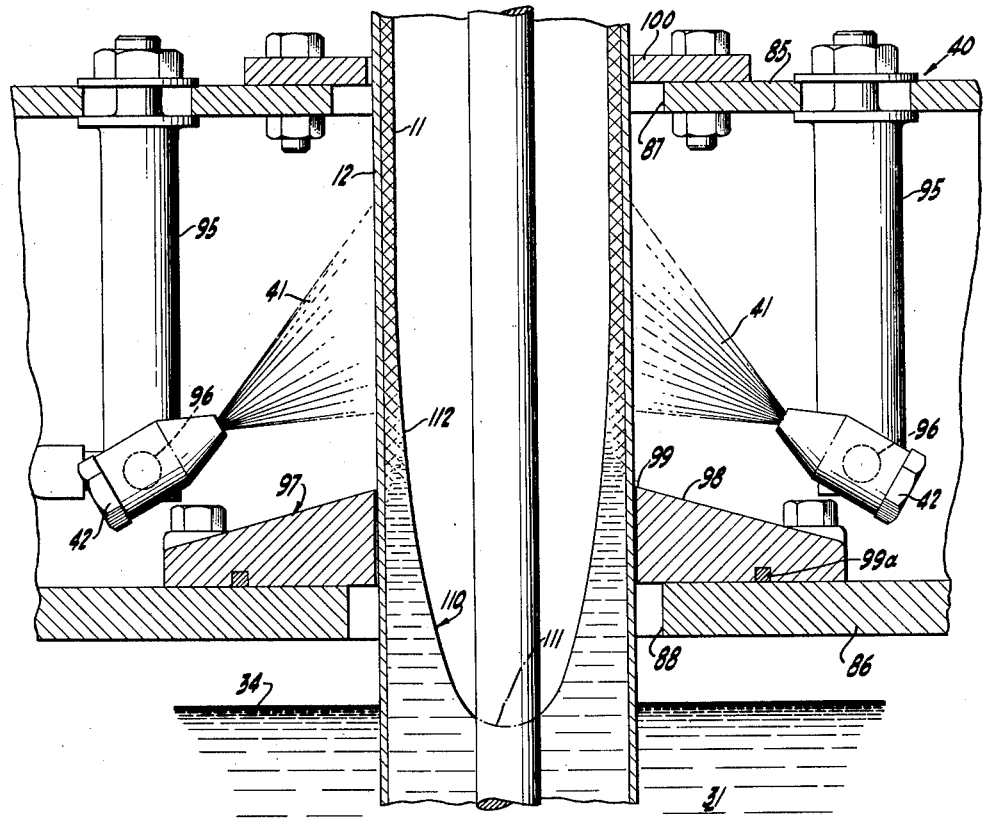
Fig. 2 is a fragmentary, vertical, sectional view of the lower end of a tube which is being lined with bearing metal and of the cooling chamber employed to solidify the molten metal.
Figure 2:
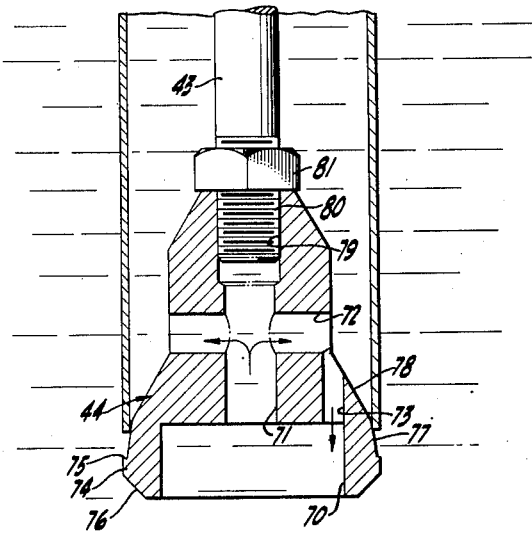

Referring now to the drawings, and more particularly to Figs. 1 and 2, the machine is generally designated as 10 and it is intended that the machine operate continuously to cast a solid and uniform lining 11 of bearing metal inside a tube 12.

As illustrated in Fig. 1, a pit 13 is provided within which a combustion vessel or furnace 14 and an hydraulic cylinder 15 are disposed. The hydraulic cylinder 15 is supplied with hydraulic fluid under pressure through an hydraulic supply line 16 containing a control valve 16a. A piston 17 is reciprocable within the cylinder 15 and it is connected to a piston rod 18 which is fixed at its upper end to a frame 19. The frame 19 supports certain of the operating elements of the machine and it is mounted on a sleeve 25 which is slidable on a rod or shaft 26 which is supported upon an operating floor 27 overlying the pit 13.

A crucible 28 is disposed within the combustion vessel 14, being suspended from the operating floor 27. Disposed beneath the crucible 28 is a burner 30 which serves to maintain a bath or pool of metal 31 in the molten state. As illustrated, the upper end of the crucible 28 is of larger diameter at 29, and the combustion vessel 14 is provided with a flue 32. The crucible 28 is provided with a funnel 33 for adding metal from time to time to maintain the liquid level at 34, and a vent tube 35 is provided for removal of gases and vapors from the molten bath 31, such tube being suitably connected to a pump or fan (not shown) to draw off the fumes and prevent their discharge to the air surrounding the machine. A cooling chamber 40 is also provided which overlies the crucible 28, and the cooling chamber 40 is provided with a spray of cooling water 41 by means of one or more nozzles 42 for the purpose of cooling and solidifying the molten metal to form the lining 11.

A mandrel or spindle 43 is provided, to the lower end of which is fixed a bottom plug or valve 44. The mandrel 43 extends upwardly and axially through the tube 12, and near its upper end it passes through bearings 45 and 46 which are fixed to the frame 19. At its upper end the mandrel 43 is connected by means of a suitable coupling 47 to an air cylinder 48 which is supplied with air under pressure through an air pressure pipe 49. The mandrel 43 also passes axially through a hollow shaft 50 which is journaled in the bearings 45 and 46 and which is supported on the frame 19 by means of a clamping collar 51. The shaft 50 is formed at its lower end with a plug or clamping element 52 which is received within the upper end of the tube 12. It is intended that, upon the admission of pressure to the cylinder 48, the bottom plug or valve 44 will be drawn upwardly and will thus firmly clamp the tube 12 to the mandrel 43, and that when pressure is released from the cylinder 48, the tube 12 will be unclamped.

Axial rotation is imparted to the shaft 50, and consequently to the tube 12, by means of a motor 53. As illustrated, the motor 53 is mounted on the frame 19 and to its shaft is fixed a pulley 54 which is connected by means of a belt 55 to a pulley 56 fixed to the shaft of a variable speed drive 57 which in turn drives a shaft 58 to which a pulley 59 is fixed. A belt 65 is led over the pulley 59 and also over a pulley 66 fixed to the hollow shaft 50. It will thus be apparent that, when the motor 53 is operating, the shaft 50 and the tube 12 will rotate about their common axis, and that the speed of rotation thereof is adjustable by means of the variable speed drive 57.

Mechanically, and as thus far described, the machine operates as follows: A bath or pool of molten metal 31 is provided and an adequate level 34 is maintained by operating the burner 30 and by adding metal from time to time or continuously, as desired, to the pool 31 through the funnel 33. Cooling water is admitted to the nozzles 42 through a water supply pipe 68 under the control of a throttle valve 69. The tube 12 is clamped in place and is then rapidly rotated by means of the motor 53 in the manner described hereinabove. Simultaneously, hydraulic pressure is admitted to the lower end of the hydraulic cylinder 15 beneath the piston 17, thus elevating the frame 19 and with it the tube 12. It will thus be apparent that simultaneous rotation of the tube 12 about its longitudinal axis and elevation thereof in an axial direction are accomplished during the casting operation, which will now be described in detail.

Referring now more particularly to Fig. 2, the bottom plug 44 is formed at its lower end with a relatively large recess or cavity 70 opening into an axial passage 71 which is intersected by radial passages 72. The plug 44 is also formed with a lateral outlet or bleed passage 73 which, as illustrated, is of relatively small diameter compared to the axial inlet passage 71 and to the radial passages 72. The plug 44 is also formed at its lower end with a head portion 74 having an annular shoulder 75 and it is formed at its extreme lower end with a conical surface 76. Above the shoulder 75 the plug 44 is formed with conical surfaces 77 and 78 and at its upper end it is threaded internally at 79 to receive the threaded lower end 80 of the mandrel 43. The plug 44 is firmly clamped to the mandrel by means of a lock nut 81.

Still referring to Fig. 2, the cooling chamber 40 is provided with a cover portion 85 and a bottom portion 86 which are formed with openings 87 and 88, respectively, to receive the tube 12. It will be noted that the openings 87 and 88 are of considerably greater diameter than the diameter of the tube 12. Studs 95 are bolted to and depend from the cover 85, and the nozzles 42 are adjustably and rotatably mounted on pins 96 at the lower ends of the studs 95 so that the angle of the nozzles and of the spray may be adjusted as desired. A circular bushing 97 is also provided, being bolted to the bottom of the cooling chamber 40. The bushing 97 has frustoconical surface 98 having a sharp inner edge 99, for a purpose explained hereinafter, and it is provided with a sealing gasket 98a. A guide collar 100 is bolted to the cover 85 of the cooling chamber 40. The bushing 97 is a true bushing and forms a close but sliding and rotating fit with the tube 12; the bushing need not, however, form a seal fit. The guide collar 100 may, and preferably does have a much looser fit with the tube 12.

The tube 12 is rotated at high speed, for example, at 700 R. P. M., and it is simultaneously lifted in the manner described hereinabove while being sprayed with cooling water or with air or other fluid coolant. As illustrated, and as explained above, the bushing 97 is formed with a tapered, frusto-conical surface 98 having a sharp edge or lip 99 which provide an important advantage in that they deflect the coolant and direct it radially and outwardly from the tube 12, thereby preventing leakage of coolant between the bushing and the tube down into the pool of molten metal. Also, the angle of the nozzles 42 is adjustable so as to direct the coolant at the proper point to achieve optimum results. Preferably, the nozzles are directed upwardly, as illustrated, and the spray is sufficiently fine that it turns to steam in the vicinity of the bushing.

As is shown in Fig. 2, under the conditions of operation, namely, a high speed of rotation, the upper surface of the molten metal in the tube assumes a parabolic form indicated at 110. The lower end or apex of the paraboloid, indicated at 111, is disposed slightly below the upper level 34 of the pool of metal outside of the tube, and the paraboloid tapers upwardly and outwardly as indicated at 112 so as to provide a progressively thinner layer of molten metal from the apex 111 to the point 112. The cooling sprays 41, under these conditions of operation, effectively cool and solidify the molten metal so as to provide a solidified lining 11 of uniform bore. Of course the lining 11, as produced by the process of the invention, requires machining to produce a finished product but the uniformity with which the lining 11 is applied is such that tubes of indefinite length can be lined with Babbitt metal or other suitable bearing metal. The lining 11 possesses a remarkable uniformity and shrinkage cracks are eliminated. The length of tube that can be so lined is limited only by mechanical consideraions, such as the inertia of the tube and the problem of supporting a long tube.

The thickness of the deposited layer may be controlled over a wide range from a few thousandths of an inch to half an inch or more by choosing the corresponding thicknesses for the molten layer at the point of solidification. Among the variables which may be adjusted at will are the fluid level of the molten metal in the crucible, the angular disposition of the cooling nozzles, and, therefore, the level above the surface of the molten bath at which they are effective, the severity or rapidity of cooling as it effects the elevation of the final solidification point or region, and the revolutions per minute of the rotating tube.

In achieving this desired result the form of the bottom plug or valve 44 is of great importance. Under the conditions of operation the bottom plug 44 functions, in effect, as a pump. Circulation of molten metal is as indicated by the arrows; that is to say, metal enters and progresses upwardly through the central inlet passage 71, thence outwardly through the radial passages 72 and downwardly through the lateral outlet passage 73. Because the latter is relatively restricted and because of the high speed of rotation, a paraboloid surface 110 having a high degree of lift is produced, which makes possible continuous casting at a rapid rate with a reasonable speed of rotation.

Another factor of importance, as indicated is the shape of the bushing 97 and another, associated factor is the presence of only a single bushing. As noted, the guide collar 100 serves merely as a guide and not as a bushing; it provides lateral support but allows considerable play of the tube 12. Thus, rotation about a fixed vertical axis is achieved at the critical point, i. e., in the immediate neighborhood of the phase boundary between the liquid and solid. Nevertheless, if, as often happens, the tube 12 is not perfectly straight but has one or more bends therein, the presence of only one bushing satisfies the condition of uniform rotation about a fixed vertical axis at the critical point, yet allows the tube to wobble, so to speak, above and below the critical point, to accommodate irregularities in the shape of tube.

Figure 3:
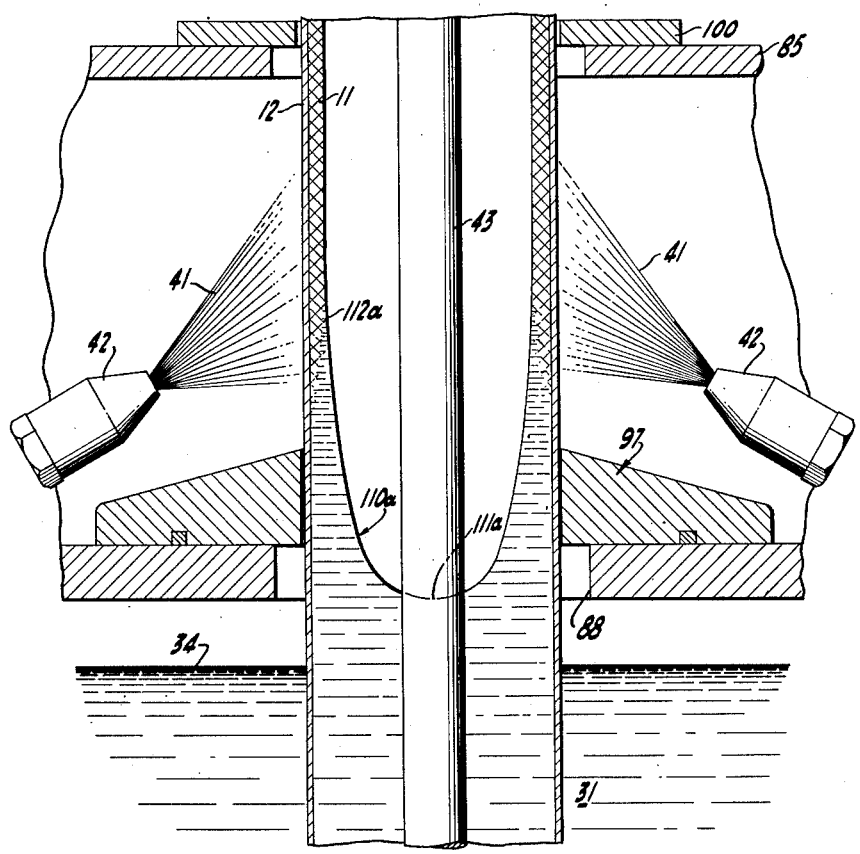
Fig. 3 is a view similar to that of Fig. 2 but showing a different form of bottom plug or valve.
Figure 3:
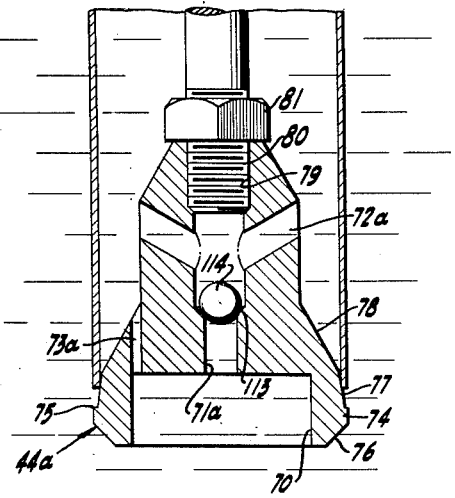

Referring now to Fig. 3, wherein similar parts are similarly numbered, a plug 44a is provided which is similarly formed with a bottom recess or cavity 70 and with an axial passage 71a which, however, is formed with a conical valve seat 113 on which a ball 114 seats. Also the radial passages 72a are slanted upwardly, as illustrated, and the lateral outlet or bleed passage 73a is of smaller diameter than the lateral outlet passage 73 of the plug illustrated in Fig. 2. As illustrated, the parabolic upper surface of the molten metal has its lower end or apex 111a above the top level 34 of the pool of molten metal. The check valve thus provided allows free inflow of liquid and outflow is possible only through the bleed passage 73a.

It will thus be apparent that a machine and a method have been provided for continuously casting a lining of bearing metal on a tube, such machine and method permitting truly continuous casting limited only by mechanical considerations. The machine and the method are the essence of simplicity, they lend themselves to rapid, continuous operation and they produce a product of high quality. The lined tubes so produced can be cut to desired lengths and machined to provide cam shaft bearings and the like having a continuous circumference. Advantageously, long sections of tube are machined before being cut into short lengths.

As explained, the bottom plug 44 or 44a plays an important role. An hydrostatic balance between radial centrifugal forces and axial hydrostatic forces is achieved. By reason of free access of liquid into the tube and restricted outflow or bleed therefrom, a parabolic surface is provided within the tube which makes the process feasible at reasonable rotational speeds. Indeed, the lateral or peripheral bleed passage may be eliminated; however, it is preferable, because without it a quantity of liquid will be trapped in the bottom of the tube as it leaves the bath, thus forming a solid plug at the lower end of the tube.

The machine may be used without a bottom plug; e. g., by forming the lower end of the tube with an inside flange to restrict outward flow of the metal from the tube. However, in this case a very high rotational speed is necessary.

Among other advantages and applications of the invention may be mentioned the following: The machine may be used for lining steel tubes with Babbitt metal without the necessity of a pre-tinning operation. Thus, if a Babbitt alloy is used which bonds to steel, the inner surface of the tube is automatically "tinned" during the casting operation. Also, the invention is applicable to other operations than lining tubes. Thus, a tube 12 of steel or other suitable material, suitably lubricated or treated to prevent its bonding to cast iron, may be employed as a permanent mold, and a body of cast iron maintained as the molten metal. After casting a "lining" onto the tube, the "lining" may be stripped therefrom to form sleeves for brake drums and brake liners, etc.

In using the machine of the invention, rotational speeds of 500 to 1100 R. P. M. and lifting rates of ¼ to 1 inch per second have been employed. It will be understood, of course, that the optimum rotational and lifting speeds will vary with the diameter of the tube, the metal being cast, etc., and that by trial and error the best speeds can be determined.

It will be apparent that other cooling means may be employed; e. g., the use of shoes surrounding the tube and provided with passages through which coolant is circulated. Such cooling means is well known in the art and requires no further description herein.

While we have illustrated and described our invention in detail, it is to be understood that various changes may be made therein by those skilled in the art without departing from the spirit of the invention as defined in the appended claims.

Having thus described our invention, what we claim and desire to secure by Letters Patent is:

1. A centrifugal casting machine for lining the interior of a tube with a layer of metal, comprising a frame, a crucible on the frame adapted to hold a body of metal, means on the frame for maintaining the body of metal in a molten state, cooling means supported by the frame at a position above the crucible and adjacent the surface of the body of the metal, other means on the frame for axially inserting a tube into the molten body of metal to approximately fill the tube with molten metal and for rotating the tube at a rate to cause the upper portion of the moten metal within the tube to move under the influence of centrifugal force outwardly and rise upwardly along the inner walls of the tube to a height above the surface of the molten metal and within the zone of the cooling means so that the upper part of the layer of molten metal so formed solidifies and adheres to the interior of the tube, said other means being operable to withdraw the tube while it is being rotated to effect a progressive application of a solid approximately uniform layer of metal to the interior of the tube, regulating means supported by said other means for controlling the ingress and egress of molten metal into and out of the bottom of the tube so as to dispose the layer of molten metal at the general height above mentioned and for maintaining said layer in substantially the same absolute position during withdrawal of the tube, said regulating means including a plug and means for clamping the same against the lower end of the tube, said plug being formed with an axial passage, and with a radial passage intersecting said axial passage.

2. A centrifugal casting machine for lining the interior of a tube with a layer of metal, comprising a frame, a crucible on the frame adapted to hold a body of metal, means on the frame for maintaining the body of metal in a molten state, cooling means supported by the frame at a position above the crucible and adjacent the surface of the body of the metal, other means on the frame for axially inserting a tube into the molten body of metal to approximately fill the tube with molten metal and for rotating the tube at a rate to cause the upper portion of the molten metal within the tube to move under the influence of centrifugal force outwardly and rise upwardly along the inner walls of the tube to a height above the surface of the molten metal and within the zone of the cooling means so that the upper part of the layer of molten metal so formed solidifies and adheres to the interior of the tube, said other means being operable to withdraw the tube while it is being rotated to effect a progressive application of a solid approximately uniform layer of metal to the interior of the tube, regulating means supported by said other means for controlling the ingress and egress of molten metal into and out of the bottom of the tube so as to dispose the layer of molten metal at the general height above mentioned and for maintaining said layer in substantially the same absolute position during withdrawal of the tube, said other means including a variable speed rotary drive mechanism to enable the attainment of the various thickness of the layers of the metal within different tubes by varying the speed of rotation of the tubes and therefore the character and height of the centrifugally formed layers of molten metal within the tubes, said regulating means including a plug and means for clamping the same against the lower end of the tube, said plug being formed with an axial passage and with a radial passage intersecting said axial passage, and means for adjusting the level at which the cooling means is effective to vary the thickness of the layer applied to the interior of the tube.

JOHN M. FOWLE.
RICHARD W. MUCHMORE.

References Cited in the file of this patent

UNITED STATES PATENTS

| Number | Name | Date |
|---|---|---|
| 737,595 | Dwyer | Sept. 1, 1903 |
| 893,037 | Underwood | July 14, 1908 |
| 950,884 | Winner | Mar. 1, 1910 |
| 1,548,618 | Lane | Aug. 4, 1925 |
| 1,727,191 | Baily | Sept. 3, 1929 |
| 1,748,851 | Smith | Feb. 25, 1930 |
| 2,110,379 | Lannert | Mar. 8, 1933 |
| 2,214,638 | Kux | Sept. 10, 1940 |
| 2,405,355 | Harrison | Aug. 6, 1946 |
| 2,424,640 | Spooner | July 29, 1947 |
| 2,450,755 | Higgins | Oct. 5, 1948 |

FOREIGN PATENTS

| Number | Country | Date |
|---|---|---|
| 401,533 | Great Britain | Nov. 16, 1933 |
| 770,188 | France | June 25, 1934 |